United States Patent
Sawada et al.

(10) Patent No.: US 6,560,962 B2
(45) Date of Patent: May 13, 2003

(54) CONTROL SYSTEM OF A HYDRAULIC CONSTRUCTION MACHINE

(75) Inventors: Hiroshi Sawada, Neyagawa (JP); Seiichi Fuchita, Katano (JP); Kouichi Kawamura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 1 day.

(21) Appl. No.: 09/888,507

(22) Filed: Jun. 26, 2001

(65) Prior Publication Data
US 2002/0014075 A1 Feb. 7, 2002

(30) Foreign Application Priority Data
Jun. 28, 2000 (JP) .............................. 2000-194580

(51) Int. Cl.[7] .............................................. F16D 31/02
(52) U.S. Cl. ........................................ 60/452; 60/468
(58) Field of Search .............................. 60/452, 468, 450, 60/420

(56) References Cited

U.S. PATENT DOCUMENTS 5,129,230 A * 7/1992 Izumi et al. .................. 60/452
5,680,760 A * 10/1997 Lunzman ..................... 60/452

FOREIGN PATENT DOCUMENTS

JP 2000035005 A * 2/2000

* cited by examiner

Primary Examiner—Edward K. Look
Assistant Examiner—Thomas E. Lazo
(74) Attorney, Agent, or Firm—Varndell & Varndell, PLLC

(57) ABSTRACT

The present invention provides for a control system 20 of a hydraulic construction machine for enhancing a responsibility and stability of a work implement movement. The control system 20 comprises a variable displacement type hydraulic pump 2, a hydraulic actuator 7 driven by hydraulic fluid delivered from the pump 2, a flow control valve 5 for controlling the flow rate of the hydraulic fluid to the hydraulic actuator 7 in response to a travel amount of an operating lever 8, the variable bleed valve 14 disposed in the bleed-off hydraulic circuit 13 through which exhausts the hydraulic fluid supplied to the hydraulic actuator 7 and a controller 15 for controlling the flow rate through the variable bleed valve 14. The controller 15 of the variable bleed valve 14 includes a storage unit 15c for storing multiple function as an opening area function which determines the optimum amount of the exhausted fluid through the variable bleed valve 14 in response to the amount of an external command signal 50 through a monitor 16.

5 Claims, 5 Drawing Sheets

CONTROL SYSTEM OF A HYDRAULIC CONSTRUCTION MACHINE

TECHNICAL FIELD

This invention relates generally to a control system of a construction machine such as a hydraulic excavator and the like, and specifically to an control system for controlling the flow rate of the hydraulic fluid which is drained to a reservoir across a variable bleed valve for developing the drive speed of each hydraulic actuator for the purpose of a high responsibility and stability when a work implement starts to be driven.

BACKGROUND OF THE INVENTION

Various methods for providing the stability of a work implement drive speed have been conventionally proposed. An abrupt increasing flow rate when a main pump starts to he driven, as shown with a full line in FIG. 6, for example, can be controllably restrained by sacrificing partially the responsibility of a hydraulic pump, or performing a bleed-of f control of main spool of a flow control valves, or disposing associated with fixed or variable orifice in each load sensing signal line through which regulates the displacement of hydraulic main pump. In order to restrain the flow rate of the hydraulic fluid from the hydraulic main pump from increasing abruptly when the work implement starts to be driven as dotted line shown in FIG. 6, with the above methods, there is provided troubles that slow drive speed (P) of the hydraulic actuator causes the work implement to lead to as low rise action during operation, that is to say, a poor responsibility and provides a poor efficiency in the hydraulic control system. To handle with these problems, the use of a high main pump in efficiency or the elimination of the orifices disposed in load sensing signal lines have been performed for over coming the above-described troubles. It could be well understood that such a approach has another problem that as shown a one dot line in FIG. 6, the drive speed of the work implement actuator increases abruptly when it starts to be driven (Q) and also a potential hunting (R) of the work implement.

For the purpose of providing for coexisting with the contrary characteristics, that is to say, responsibility and stability of hydraulic control system, Japanese published patent No. 2000-35005 assigned to the assignee of the present invention, proposed for providing an control system for enhancing the stability in a load speed even if the hydraulic main pump with a high responsibility is used in the hydraulic control system. Disclosed is that a control system of the hydraulic drive construction machine which comprises a bleed-off circuit which exhaust the detection pressure line supplied to a hydraulic actuator through the flow control valve from the displacement type hydraulic main pump, a variable bleed valve disposed in the bleed-off circuit so that the hydraulic fluid through a flow control valve to a reservoir is possibly controlled to exhaust, and a controller for determining an amount of the exhausted fluid through the bleed valve in response to delivery pressure of the hydraulic main pump. With such construction, the prior bleed-off control circuit has provided for a high stability in the respective drive speed of each hydraulic actuator of the work implement without depending on the spool stroke of the flow control valve or an amount of a manually operable lever stroke.

This type of hydraulic construction machine can be generally used to carry out the various type of works, for example, a digging work which the bucket mounted pivotally at free end of the arm is pushed against the each side portion of a trench by actuating the boom hydraulic actuator and the arm hydraulic actuator while the operating lever is set at the position that the work implement mounted on the frame can turn, a land grinding work forwards and rearwards, and the like, except a digging work. It could be noted that the responsibility and stability in the work implement drive speed should be respectively varied depending on the desired characteristics for the types of work when the work implement starts to be driven. However, the prior foregoing flow control has a drawback that since the flow amount of the hydraulic fluid through the variable bleed valve to the reservoir is absolutely determined based on the delivery pressure of the hydraulic main pump. With thus construction, it was impossible that a suitable characteristic required for the respective type of work completely provides for ensuring efficiently for the respective type of work.

The present invention is to overcoming the problems set forth above. An object of the present invention is to provide a hydraulic control system of the hydraulic drive excavator for ensuring the stability of the work implement by eliminating an abrupt movement of the work implement actuator while a high responsibility of the work implement being ensured when it starts to be driven.

Another object of the present invention is to provide a hydraulic construction machine which provides a control system for ensuring the optimum characteristic required for respective type of work through a monitor.

DISCLOSURE OF THE INVENTION

In order to achieve the above object, according to the first invention, there is provided a control system of a hydraulic construction machine including a variable displacement type hydraulic pump, a hydraulic actuator driven by hydraulic fluid from the main pump, a flow control device for controllably supplying a flow of the hydraulic fluid to the hydraulic actuators from the main pump in response to an amount of a manually operable lever stroke, or a spool stroke thereof, a variable bleed valve disposed in a bleed-off hydraulic circuit through which the hydraulic fluid exhausts to a reservoir, and a controller for regulating an opening area of the variable bleed valve, is characterized in that said controller includes a storage unit containing a plurality of functions as an opening area function which determines the optimum flow amount of the hydraulic fluid through the variable bleed valve, and a selecting means such as a monitor is connected to the controller so that the desired opening area function among plural functions can be generated and transmitted to the controller.

With the first invention, there is provided the bleed-off circuit for exhausting the hydraulic fluid which flows to hydraulic actuator through the flow control device, the bleed-off circuit including a variable bleed valve which determines the opening area thereof or the amount of the hydraulic exhausted fluid to the reservoir in response of external command signals from the controller of the variable bleed valve. With thus arranged, there is provided the selecting means such as the monitor generating an external command signal and transmitting to the controller of the variable bleed valve in order to select the desired opening area function among a plurality of the types of works such as "Heavy Power Mode", "General Standard Power Mode" and "Light Power Mode" and the like, which is respectively stored in the storage unit. The optimum opening function required for the selected type of work is read out in responsive to the selected command signal from the external monitor and the like. With thus, this brings to obtain the optimum characteristic or a high responsibility and stability to meet with the desired characteristic for the selected type of work.

In the second invention according to the first invention, a storage unit containing a plurality of functions as an opening area function which determines the optimum flow amount of the hydraulic fluid through a variable bleed valve is characterized in that the storage unit has a plurality of data maps which are made based on the associated plural opening areas of the variable bleed-off correlated with the delivery pressure of the hydraulic main pump.

In the third invention according to the first invention, a storage unit containing a plurality of functions as an opening area function which determines the optimum flow amount of the hydraulic fluid through the variable bleed valve is characterized in that the storage unit have a plurality of data maps which are made based on the associated plural opening areas of the variable bleed-off correlated with an elapsed time after actuation of the hydraulic actuator.

In the forth invention according to the first invention, a storage unit containing a plurality of functions as an opening area function which determines the optimum flow amount of the hydraulic fluid through the variable bleed valve is characterized in that the storage unit have a plurality of data maps which are made based on the associated plural opening areas of the variable bleed-off correlated with a spool stroke of said flow control valve.

In the forth invention according to the first invention, there is provided an control system of a hydraulic construction machine including a variable displacement type of hydraulic main pump, a hydraulic actuator driven by the main pump, a flow control device for controllably supplying the hydraulic fluid to the hydraulic actuator from the main pump in response to a amount of a manually operable lever stroke or the spool stroke thereof, a variable bleed valve disposed in a bleed-off circuit through which hydraulic fluid exhausts to reservoir, and a controller for regulating the opening area of the variable bleed valve, is characterized in that the controller includes a storage unit storing an opening function characteristics which the associated amount of the opening area of variable bleedvalve correlated with the delivery pressure of the hydraulic main pump, maintaining a predetermined amount (flat line) indicative of the unloading pressure if the delivery pressure PP of the hydraulic main pump is less than P1, decreasing as the delivery pressure PP of the hydraulic main pump increases if the delivery pressure PP of the hydraulic mainpump exceeds P1 and be equal to or less than P2, maintaining a predetermined amount indicative of the opening area at the relief pressure less than that at the unloading pressure P1 when the delivery pressure PP of the hydraulic main pump exceeds P1

The practice of the present invention causes the work implement to prevent from performing an abrupt movement, while provided with an adequate responsibility when the work implement starts to be driven, thus ensuring the stability for the work implement and further the relief pressure in system circuit during normal work.

DETAIL DESCRIPTION OF PROFFERED EMBODIMENT

Figure 1:
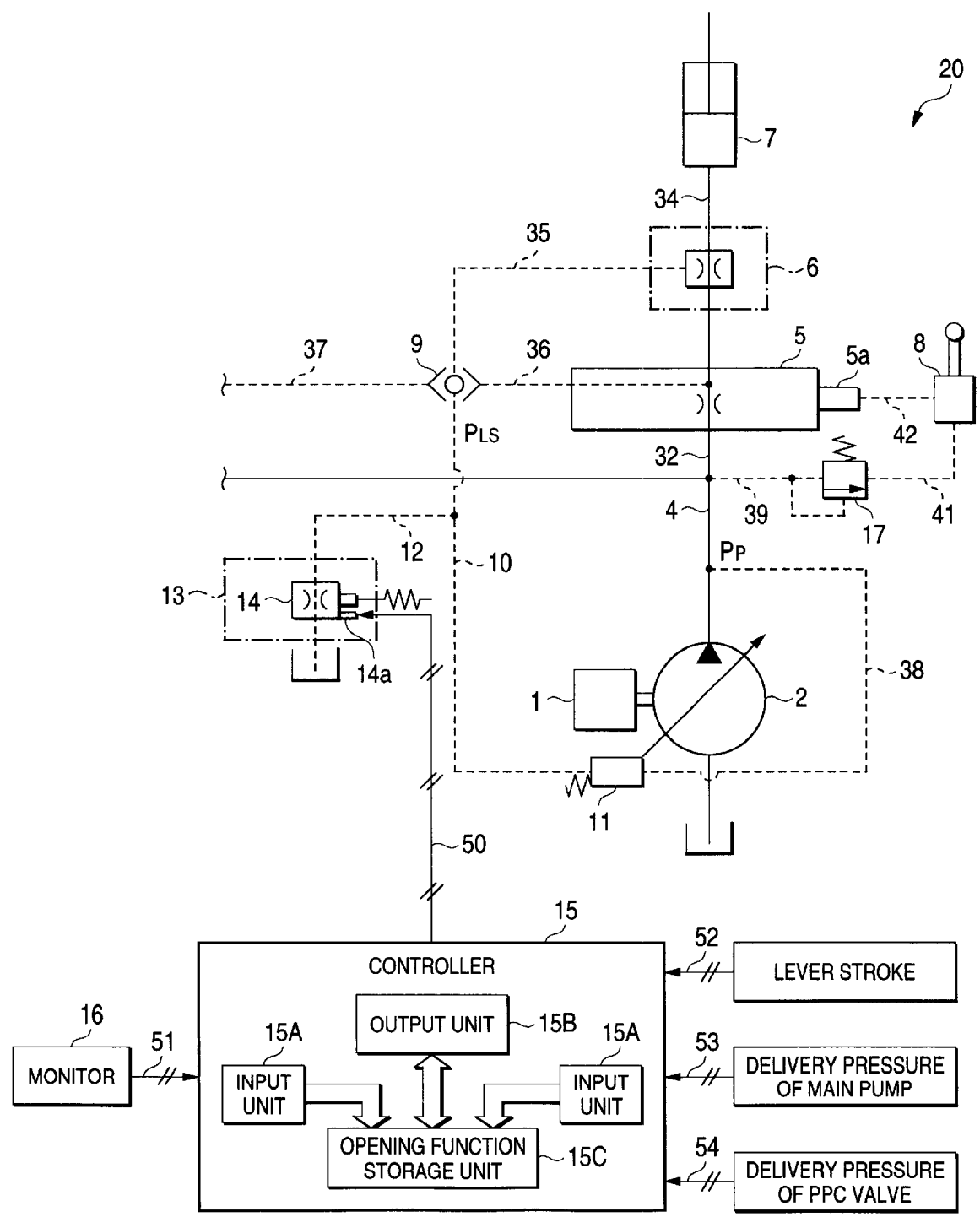
FIG. 1 is a schematic representation of a hydraulic control system for working machine incorporating first embodiment of the subject invention.

Turning now to the drawings, it can be seen that a preferred embodiment of hydraulic control system for a hydraulic construction machine such as a hydraulic excavator is disclosed With the first embodiment of the present invention, Referring to FIG. 1, a hydraulic system of a hydraulic excavator is illustrated.

The control system employed for the hydraulic construction machine such as the hydraulic excavator is generally referred to by the reference number 20 in FIG. 1. The hydraulic control system includes an engine 1, a variable displacement type hydraulic pump 2 driven by the engine 1, a plurality of flow control valves (directional control valves) 5 through which hydraulic fluid from the main pump 2 is supplied to a hydraulic actuator 7 via a line 4 and 34, a compensated pressure valve 6 disposed between the flow control valve 5 and the hydraulic actuator 7. The hydraulic actuator 7 provides respectively for controlling to simultaneously or selectively move the work implement element such as a boom, an arm, and a bucket by expanding and contracting the actuator 7. In FIG. 1, the hydraulic circuit including single hydraulic actuator is represented for the present invention.

With a manually operable lever 8 including an electric control lever arranged, it is adopted to control the spool stroke of the flow control valve 5. The manipulation of this lever 8 causes a pilot pressured fluid to feed to an acting port 5a of the flow control valve 5 through the main pump 2, the line 4, a pressure reducing valve 17, a line 39, 40 and the lever 8, to move it to an operating position, thereby varying the opening area of the flow control valve 5 in response to the spool stroke of the flow control valve 5 to control the delivery flow rate from the hydraulic main pump 2.

A plurality of load pressure in a load signal line 36, 37 generated by actuation of the hydraulic actuator 7 is transmitted to a signal resolver 9, or a shuttle valve. The highest one (PLS) among hydraulic fluid in the load pressure in the load signal line 36, 37 and the like is selected by the signal resolver 9, or the shuttle valve and transmitted to operate a swash-plate angle control means 11 of the hydraulic main pump 2 through the signal resolver 9 and a signal line 10, while connecting to the pressure compensating valve 6 through a signal line 35.

The variable displacement type hydraulic main pump 2 is provided with the swash-plate angle control means 11 for a load sensing hydraulic control system, which compares the delivery pressure PP in line 39 from the hydraulic main pump 2 with the maximum load pressure PLS in the signal line 10, 36 and controls the displacement of the pump 2 such that the delivery pressure PP is larger than the maximum load pressure PLS by the different pressure between the former and the later. If the delivery pressure PP is larger than the maximum load pressure PLS, the swash-plate angle is decreasingly varied to reduce the displacement of the main pump 2. If the delivery pressure PP is smaller than the maximum load pressure PLS, the swash-plate angle is increasingly varied the displacement of the main pump 2.

The detection line 35 through which the delivery hydraulic fluid from the main pump 2 is supplied to the hydraulic actuator 7 after the flow control valve 5 is connected to a bleed-off circuit 13 via a line 12 which is branched from the signal line 10. The variable bleed valve 14 disposed in the bleed-off circuit 13 controllably varies the opening area by moving the valve spool thereof in response to a control signal 50 urged to a solenoid 14a from the output unit 15b in a controller 15, result in the exhausted fluid therethrough controllably varying via the line 12 to the reservoir.

Figure 2:
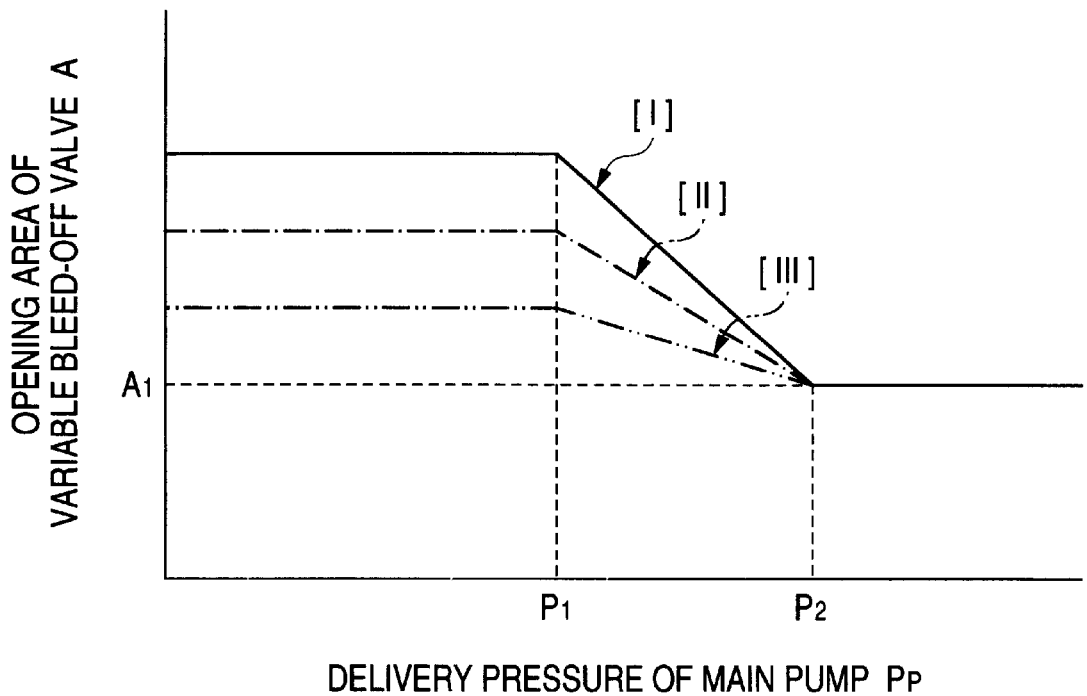
FIG. 2 is a schematic diagram showing a delivery pressure of a hydraulic main pump and corresponding resulting the opening area of the variable bleed valve.

To control the opening area of the variable bleed valve 14, an external signal 54 which is indicative of a pilot pressure through a proportional pressure control valve through the actuation of the manually operable lever 8, an external signal 52 indicative of the stroke of the operating lever, as well as an external signal 53 indicative of delivery pressure Pp of the hydraulic main pump detected by a pressure sensor (not shown) and further an external signal 51 indicative of the types of work which is selected through actuation of the manually operable selection means, are connected to the controller 15. Thereby, as shown in FIG. 2, a opening function storage unit 15c in the controller 15 contains plural data maps [I], [II], [III] indicating of the optimum opening area of the variable bleed valve 14, correlated with the delivery pressure of the hydraulic main pump 2. The controller 15 receives a signal 53 indicative of the delivery pressure of the pump 2, read out an associated data with an opening area of the variable bleed valve 14, correlated with delivery pressure of the hydraulic main pump from the storage unit 15a, and then deliver the a command signal 50 indicative of the opening area for urging a solenoid 14a of the variable bleed valve 14.

Thus constructed, a selected signal 51 from a monitor 16 inputs to the input device in the controller 15 through operation of the monitor 16 or selection by selecting means for determining the type of work. The controller 15 processes the respective signal to select the desired opening area function among a plurality of the opening area functions such as [I], [II] and [III] stored in the storage unit. In result, the opening area of the variable bleed valve 14 varies depending on a current delivery pressure Pp of the hydraulic main pump 2 based on the function relation as shown in FIG. 2.

Figure 7:
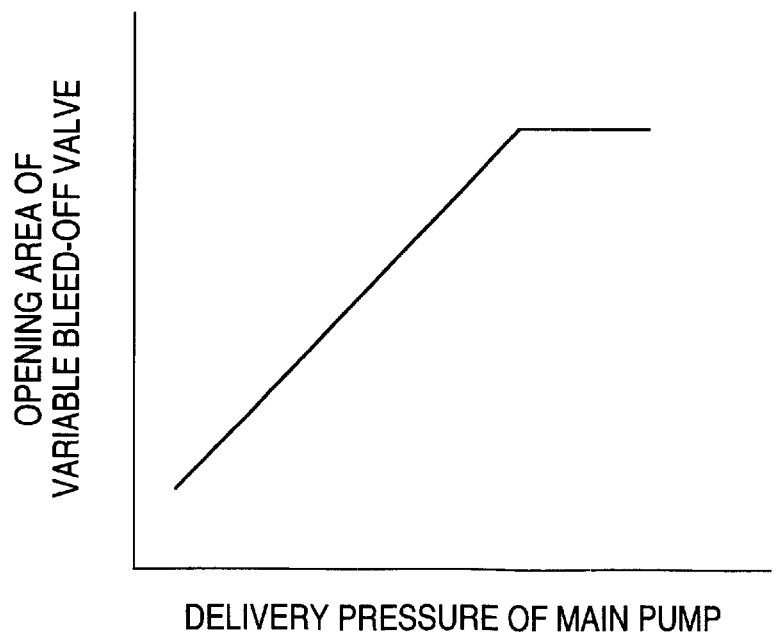
FIG. 7 is a schematic diagram showing a delivery pressure of a hydraulic main pump and corresponding resulting the opening area of the variable bleed valve of the prior art.

It has been generally understood as shown in FIG. 7 that a control characteristic that the opening area of the variable bleed valve 14 increases with increase in the delivery pressure PP of the hydraulic main pump 2. In such a case, considering from the point of ensuring a relief pressure in the hydraulic control system, in certain hydraulic construction machine, there occurs a problem that if the delivery pressure PP of the hydraulic main pump 2 exceeds the neutral pressure or unload pressure P2 of the flow control valve, the opening area opens fully before a relief pressure reaches and thereafter the hydraulic fluid through the variable bleed valve 14 to reservoir is limited to exhaust and maintains a constant opening area (a horizontal line) in as shown FIG. 7. As result in, the trouble arises that when the delivery pressure PP of the hydraulic main pump 2 exceeds P1 and is equal to or less than the relief pressure P2 (middle zone), an stable conditions in the movement of the work implement actuator is not provided. To solve this trouble, it is desirable to provide as shown in FIG. 2 that the relation between the delivery pressure of a hydraulic main pump and the corresponding the opening area of the variable bleed valve. FIG. 2 shows that if the delivery pressure PP of the hydraulic main pump 2 is equal to or less than a working pressure P1, the opening area of the variable bleed valve is desirable to maintains at a constant or predetermined target amount so that the relief pressure P2 in hydraulic control system can be ensure. If the delivery pressure Pp of the hydraulic main pump 2 is at middle range between the working pressure P1 and the relief pressure P2, the opening area of the variable bleedvalve 14 varies decreasingly in response to the delivery pressure PP of the hydraulic main pump 2 and, the opening area [A1] at the relief pressure P2 maintains a constant amount in the system pressure if the delivery pressure Pp is equal to or exceeds the relief pressure P2. Thus resulting in the relief pressure P2 being created and also the opening area of the variable bleed valve required for a stable condition in the middle zone being ensured within the range of the middle zone (P1<Pp<=P2). This characteristic provides a stable movement of the actuator of the work implement.

With this embodiment, the storage unit 15c reads out an optimum opening area function for the selected type of work among a plurality of opening area functions stored in therein by actuating the selecting means through the monitor 16 and the like. With result in the optimum ability and responsibility for the selected the type of work being ensured.

Figure 3:
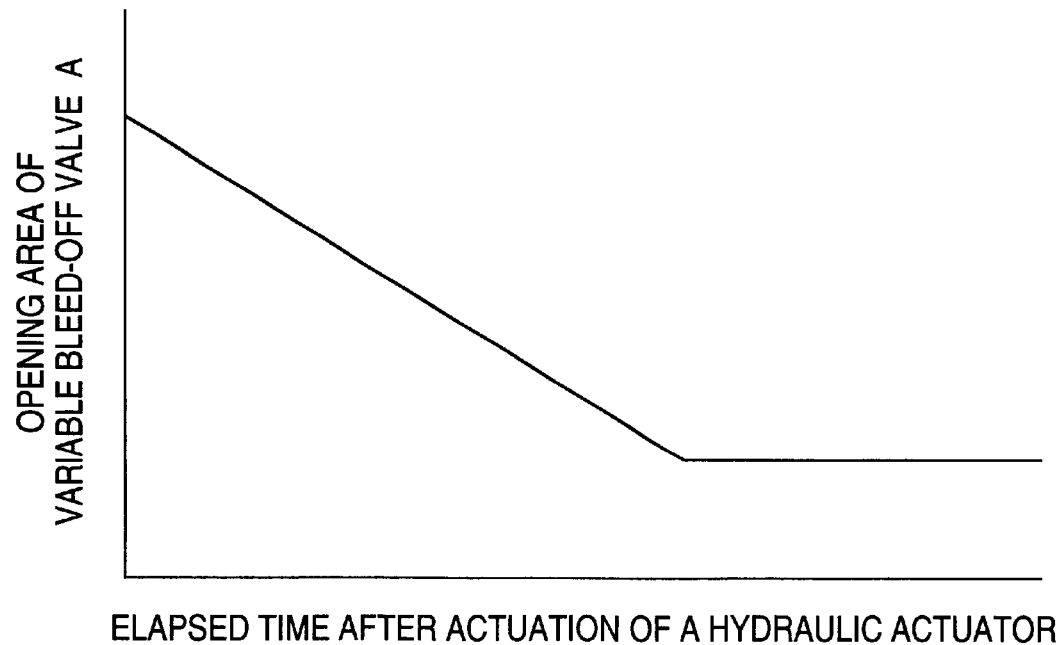
FIG. 3 is a schematic diagram showing elapsed time pump after actuation of a hydraulic actuator of a hydraulic and corresponding resulting the opening area of the variable bleed valve.

With this embodiment, although it was described that a opening area of the variable bleed valve 14 is controllably varies depending on the delivery pressure Pp of the hydraulic main pump 2, another embodiment may be provided that the opening area of the variable bleed valve 14 is decreasingly varied in response to the elapsed time [t] accounted after actuation of the manually operating lever 8 or actuation of the hydraulic actuator 7 as shown in FIG. 3. Consequently, with such arrangement, these embodiments provide the hydraulic control system so that the hydraulic fluid through the bleed valve 14 can be exhausted to reservoir soon after the work implement starts to be moved, which have a importance effect upon the stability of the work implement movement, result in the stable actuation of the hydraulic actuator enhancing An electric control lever is more preferably used as the manually operable means 8

Figure 4:
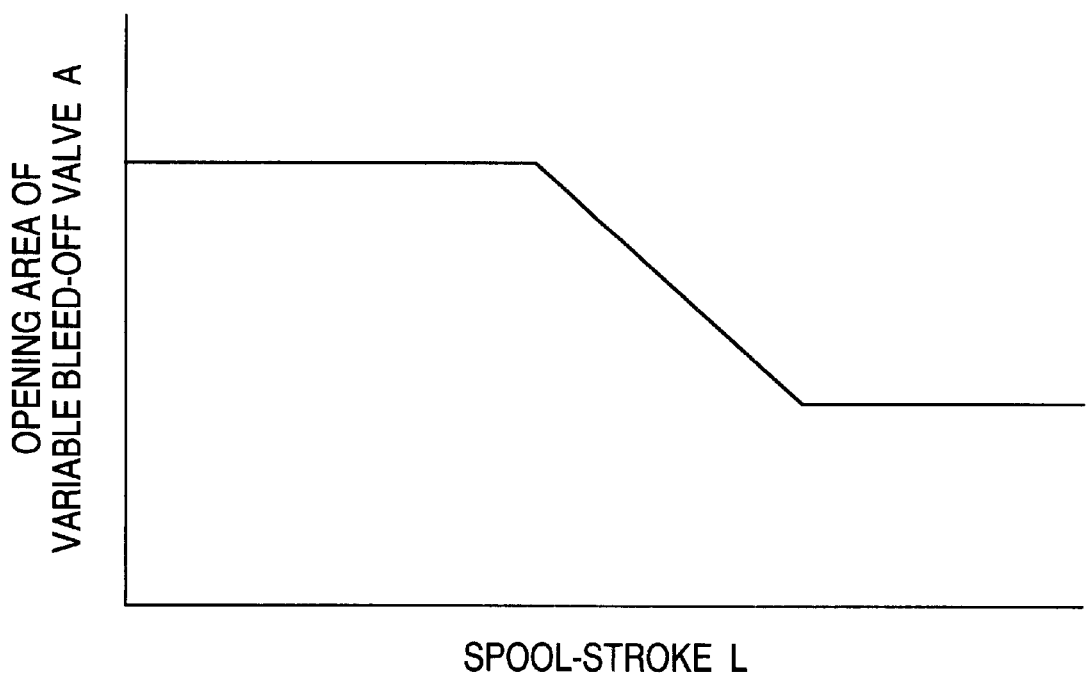
FIG. 4 is a schematic diagram showing a spool-stroke and corresponding resulting the opening area of the variable bleed valve.

Furthermore, another embodiment will be described by referring to FIG. 4. In this embodiment, the opening area of the variable bleed valve 14 decreasingly varies depending on respective of detected stroke [L] of the spool of the flow control valve 5 or an amount of the manually operable lever 8. As described above, if the electric control lever is adopted, it will be possible that a potentiometer (not shown) mounted at the electric control lever detects the rotational angle thereof and generates a electric signal indicate of the rotational angle for the controller 15. In other embodiment, the variation in a drive speed of the operable control lever 8 can possibly control the opening area of the variable bleed valve 14.

In addition, although the control has been explained so far that the opening area of the variable bleed valve 14 is respectively controlled based on the any one of the signal indicative of delivery pressure PP from main pump 2, the elapsed time [t] after actuation of the hydraulic actuator 7 and the spool stroke [L] of the flow control valve 5, the combined controls can be preferably performed that the smallest one among the opening areas [A] which are respectively determined based on three factors [Pb], [t], [L] as set forth can be preferably selected.

Figure 5:
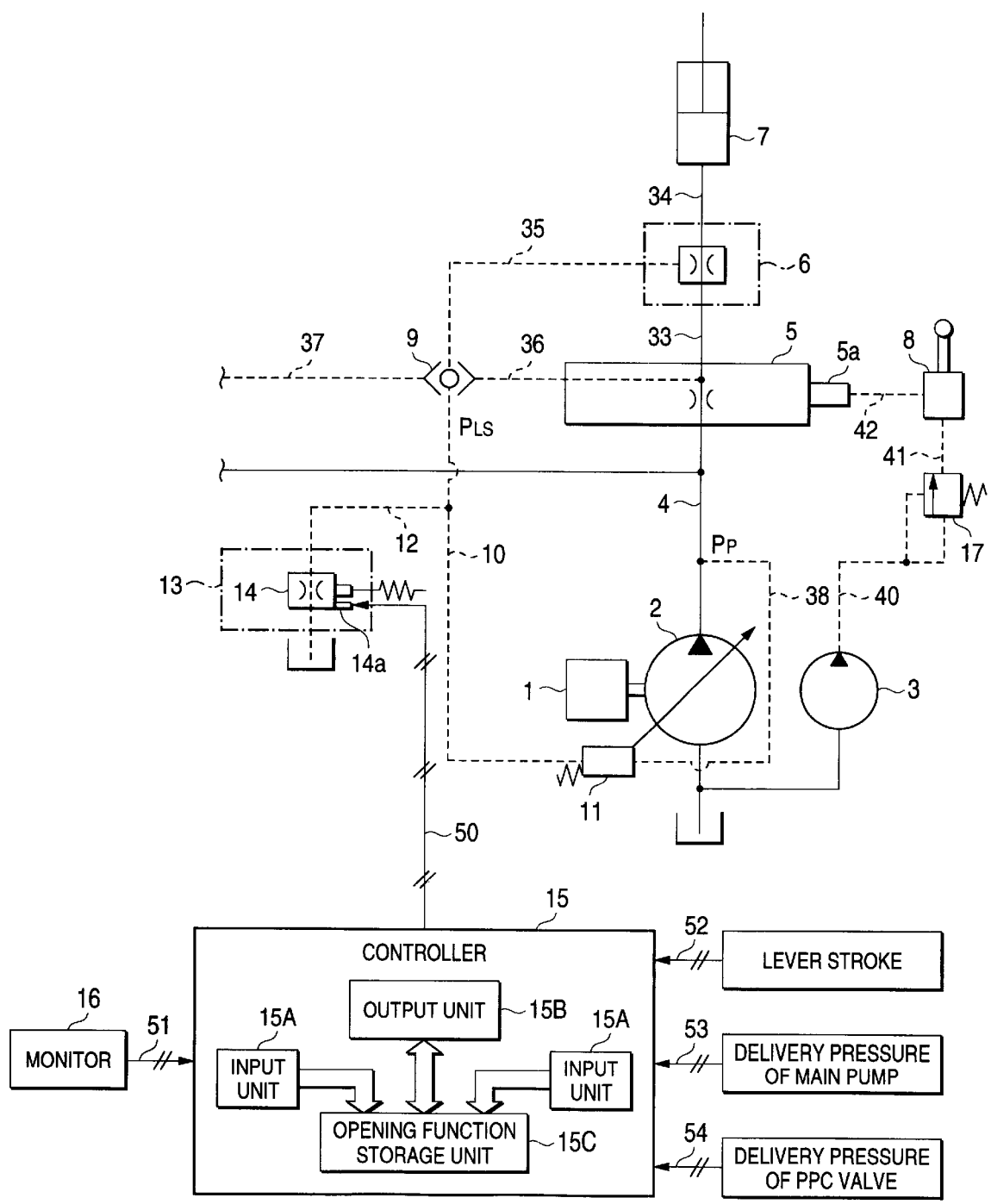
FIG. 5 is a schematic diagram showing a schematic representation of a hydraulic control system for hydraulic construction machine incorporating second embodiment of the subject invention.
Figure 6:
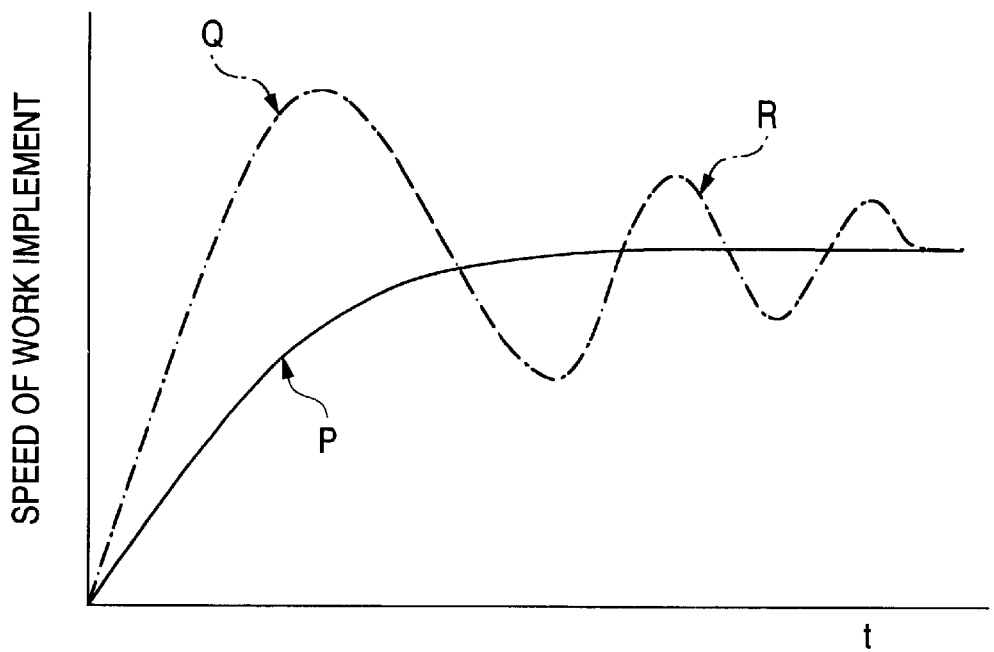
FIG. 6 is schematic diagram showing rating speed of work implement when it starts to be driven.

Although the electric control lever 8 is represented in place of the lever of the flow control valve as shown in FIG. 1, the flow control valve can be also further driven by the delivery pressure from the control pump 3 through the hydraulic fluid line 40, the reducing pressure valve 17, line 41, 42 the lever 8 disposing at a pilot pressure control valve (not shown) and a line 42 in FIG. 5. With the hydraulic control system shown in FIG. 5, a delivery pressure from the control pump 3 is constructed to communicate with an pilot pressure control valve disposed at the manually operable lever 8 through a pressure reducing valve 17 and to supply to the each side port 5a of the flow control valve 5 to move the valve spool when the manually operable lever 8 is manipulated.

Although the foregoing description has been described regarding the hydraulic excavator, the present invention can also have application in other hydraulic drive machine.

As is evident from the foregoing description, certain aspects of the present invention are not limited to the particular details of the examples illustrated herein, many modifications and variations of the present invention are possible in the light of the above teachings. It is, therefore, to be understood that within the scope of the appended claims, wherein reference numerals are merely for convenience and are not to be in any way limiting, the invention may be practiced otherwise than as specially described.

What we claim is:

1. A control system of a hydraulic construction machine having a variable displacement type hydraulic pump, a hydraulic actuator driven by hydraulic fluid delivered from the pump, a flow control valve for controlling the flow rate of the hydraulic fluid in response to a travel amount of a manually operable lever to the hydraulic actuator, a variable bleed-off valve disposed in a bleed-off hydraulic circuit which exhausts the hydraulic fluid supplied to the hydraulic actuator, and a controller of the variable bleed-off valve for controlling the flow rate of the exhausted fluid through the variable bleed-off valve, wherein said controller contains a storage unit for storing a plurality of functions as a function of opening area function which determine the desired flow rate of the exhausted fluid through said variable bleed-off valve to a reservoir by the actuation of said manually operable lever which is connected to the said controller.

2. The control system for a hydraulic construction machine as set forth in claim 1, wherein said storage unit contains an opening area of the variable bleed-off valve, correlated with delivery pressure of the variable displacement type hydraulic main pump.

3. A control system of a hydraulic construction machine having a variable displacement type hydraulic pump, a hydraulic actuator driven by hydraulic fluid delivered from the pump, a flow control valve for controlling the flow rate of the hydraulic fluid in response to a travel amount of a manually operable lever to the hydraulic actuator, a variable bleed-off valve disposed in a bleed-off hydraulic circuit which exhausts the hydraulic fluid supplied to the hydraulic actuator, and a controller of the variable bleed-off valve for controlling the flow rate of the exhausted fluid through the variable bleed-off valve, wherein said controller contains a storage unit for storing a plurality of functions as a function of opening area function which determine the desired flow rate of the exhausted fluid through said variable bleed-off valve to a reservoir by the actuation of said manually operable lever which is connected to the controller; and said storage unit contains an opening area of the variable bleed-off valve, correlated with an elapsed time after actuation of the hydraulic actuator.

4. The control system for a hydraulic construction machine as set forth in claim 1, wherein said storage unit contains an opening area of the variable bleed-off valve, correlated with a spool stroke of said flow control valve.

5. A control system of a hydraulic construction machine having a variable displacement type hydraulic pump, a hydraulic actuator driven by hydraulic fluid delivered from the pump, a flow control valve for controlling the flow rate of the hydraulic fluid in response to a travel amount of a manually operable lever to the hydraulic actuator, a variable bleed-off valve disposed in a bleed-off hydraulic circuit which exhausts the hydraulic fluid supplied to hydraulic actuator, and a controller of the variable bleed-off valve for controlling the flow rate of the exhausted fluid through the variable bleed-off valve, wherein said controller contains a storage unit for storing the associated amount of the opening area of the variable bleed-off valve correlated with the delivery pressure of said hydraulic main pump, for maintaining a determined amount if a delivery pressure PP of the hydraulic main pump is less than a neutral pressure P1, for decreasing as the PP increases if PP exceeds or is equal to P1 and is less than a relief pressure P2, and for maintaining a determined amount indicated of the opening area of the variable bleed-off valve at the relief point in the system pressure if the delivery pressure PP exceeds P2.

* * * * *